Feb. 4, 1958

R. A. HAUS 2,822,009

EGG PUNCTURERS

Filed Oct. 25, 1954

INVENTOR.
Roy A. Haus
BY
Edward C. Healy
ATTORNEY 2,822,009

EGG PUNCTURERS

Roy A. Haus, San Francisco, Calif.

Application October 25, 1954, Serial No. 464,531

3 Claims. (Cl. 146—2)

The invention relates to culinary devices and more particularly to devices arranged to produce a small hole through the shell at the large end of an egg so as to vent the air cell of the egg preparatory to boiling of the egg in its shell.

It is a common experience in the preparation of boiled eggs that the egg shell will crack upon being deposited into boiling water, with consequent running out of the shell and loss of part of the contents of the egg, foaming up and boiling over of the water, entry of water into the egg shell, and subsequent leakage onto the plate or dish used for serving the egg, deforming and overcooking and imperfect timing generally of the cooking period. Various devices have been proposed for avoiding these results and consequences by the simple expedient of puncturing the egg shell at the large end of the egg prior to depositing the egg in the boiling water. However, as will be understood, the shells of eggs are most frangible and the results obtainable with these devices are not always satisfactory since the piercing of the egg shell may frequently be accompanied by a cracking or breaking of the shell. It is accordingly an object of the present invention to provide a device of the character described which will afford an improved support for the frangible egg shell during the piercing operation whereby the incidence of cracking or breaking of the shell during the forming of the vent opening is substantially eliminated.

A further object of the invention is the provision of a gripping means on the bottom surface of the base that will retain the device in a fixed position relative to a supporting surface and will prevent a sliding of the device during the egg puncturing operation.

A further object of the invention is the production of a device of the character described that is simple in construction, economical to manufacture, strong, durable, and highly efficient and serviceable in use.

Figure 1:
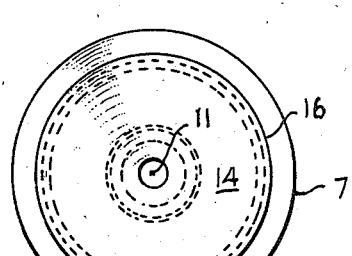
Figure 2:
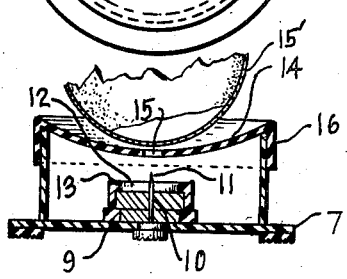
Figure 3:
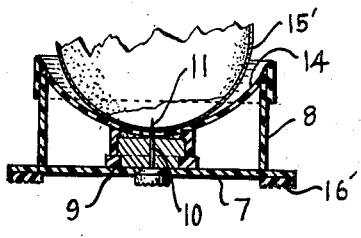
Figure 4:
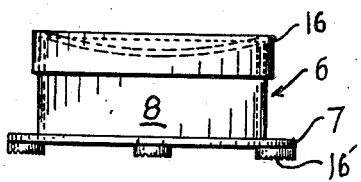
Figure 5:
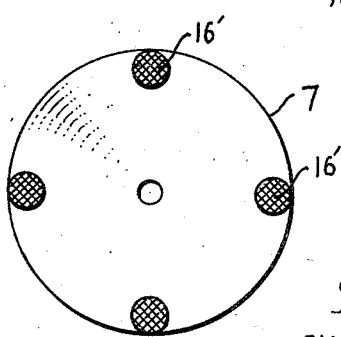

In the accompanying drawing forming a part of this specification and in which like numerals are employed to designate like parts throughout the same, Fig. 1 is a top plan view of the device constructed in accordance with my invention, Fig. 2 is a transverse vertical sectional view of the device and disclosing an egg about to be lowered on the pliable cushioning element or diaphragm of the invention to thus make contact with the shell puncturing means, Fig. 3 is a similar view disclosing the device in an operative position when the egg shell is punctured, Fig. 4 is a side elevational view of the device, and Fig. 5 is a bottom plan view of the same.

It is a well known fact that eggs have an air pocket in the larger end thereof. If, before boiling the egg, the shell surrounding the air pocket is penetrated, the egg will not swell because of confined air expansion and danger of breaking of the egg while cooking the same will be eliminated by the simple and unique expediency herein employed.

The egg piercing device of the present invention consists, briefly, of a diaphragm 14 of pliable, resiliently stretchable material such as rubber, natural or synthetic, means 6 providing a peripheral support for the diaphragm and permitting resilient distension of the central portion thereof upon engagement and displacement by the end 15' of an egg, and an egg shell piercing pin 10 mounted generally perpendicularly to the diaphragm 14 and substantially centrally thereof and having a sharpened end 11 positioned to engage and pierce the egg end 15' upon displacement as aforesaid, it being particularly noted that in such displacement the diaphragm will be resiliently stretched over the egg and to provide a full and continuous support of the shell about and symmetrical to the point of incision, whereby breaking or cracking of the shell during the piercing action is substantially completely avoided.

Preferably, the diaphragm 14 is molded or otherwise preformed with a concavo-convex shape so as to provide a concave receptacle on its outer side for receipt of the end 15' of the egg, and the center of the diaphragm is desirably formed with an opening 15 in axial registration with the pin 10 so as to permit the pin to pass through the opening to engage and pierce the egg end upon downward displacement of the egg, as seen in Figures 2 and 3.

For ease and economy of manufacture and assembly, the supporting means 6 is composed of a base member which conveniently may be stamped or molded from metal, plastic, or the like, and is here provided with a bottom wall 7 and an annular upstanding flange or collar 8. As a feature of the present invention, the diaphragm 14 is formed with an integral depending peripheral skirt 16 which is dimensioned for fitting tightly about the collar to provide the peripheral support for the diaphragm and thus enabling the assembly of the unit by the simple step of expanding or stretching the skirt 16 into place over the upper end of the collar 8.

As another feature of the present construction, the base is formed with a stop 13 which is normally positioned, as seen in Figure 2, in spaced relation below and generally concentric to the convex side of the diaphragm so as to engage the diaphragm about the opening 15 to very precisely limit the extent of penetration of the pin end 11 into the air cell of the egg. As here shown, the stop 13 may be fashioned as a built-up rest or shoulder 13 formed on a standard portion 9 on the base, which also provides a support for the pin 10, it being noted that the shoulder 13 concentrically surrounds the pin end 11 to provide a recess 12 arranged to receive the central portion of the diaphragm and egg end, as seen in Figure 3. The numeral 16' designates a plurality of corrugated feet that are provided on the marginal edges of the base 7 to thus prevent slippage of the device.

It will be obvious that the puncturing operation can be readily performed with one hand. The resilient flexibility of the rubber diaphragm or cradle reduces the possibility of breakage of the egg if the egg is brought down on the surface with too much force. In practice, the egg is centered and supported over the pin point by the rubber cradle until downward pressure is exerted and throughout the puncturing operation. The rubber cradle will exert an increasing counter-pressure as the egg is pushed down on the pin point. The counter-pressure "brakes" the downward movement of the egg when pressure is required to pierce the shell and the said cradle further functions to eliminate the possibility of breaking the egg by any sharp impact at the end of a downward movement of the egg. Additionally, the cradle in its elevated position reduces the possibility of accidentally pricking a finger on the pin.

It is to be understood that the form of my invention herewith shown and described is to be taken as a preferred example of the same and that various changes relative

Having thus described my invention, I claim:

1. An egg shell piercing device comprising, a concavo-convex diaphragm of resiliently stretchable material, means providing a peripheral support for said diaphragm and permitting resilient distension of the central portion of said diaphragm upon engagement and displacement thereof by the end of an egg, said diaphragm being formed with a centrally arranged opening, and an egg shell piercing pin mounted generally perpendicularly to said diaphragm and substantially centrally thereof in position to pass through said opening to engage and pierce said egg end upon said displacement, said diaphragm upon said displacement being stretched over said egg end to provide support for said egg shell about and symmetrical to the point of incision of said pin.

2. An egg shell piercing device comprising, a base having an annular upstanding collar, an egg shell piercing pin carried by said base axially of said collar, and a concavo-convex diaphragm of resiliently stretchable material having a peripheral skirt dimensioned for fitting about said collar to provide a peripheral support for said diaphragm with the concave side thereof outermost and permitting resilient distension of the central portion of said diaphragm to and from said pin upon engagement and displacement of the concave side of said diaphragm by the end of an egg, said diaphragm being formed with a centrally arranged opening to receive said pin for piercing said egg end and being stretched over said egg end upon said displacement to provide support for said egg shell about and symmetrical to the point of incision of said pin.

3. An egg shell piercing device comprising, a base having an annular upstanding collar, an egg shell piercing pin carried by said base axially of said collar, and a concavo-convex diaphragm of resiliently stretchable material having a peripheral skirt dimensioned for fitting about said collar to provide a peripheral support for said diaphragm with the concave side thereof outermost and permitting resilient distension of the central portion of said diaphragm to and from said pin upon engagement and displacement of the concave side of said diaphragm by the end of an egg, said diaphragm being formed with a centrally arranged opening to receive said pin for piercing said egg end and being stretched over said egg end upon said displacement to provide support for said egg shell about and symmetrical to the point of incision of said pin, said base being formed with a stop positioned to engage the convex side of said diaphragm upon said displacement to limit the extent of said incision.

References Cited in the file of this patent

UNITED STATES PATENTS

| | | |
|---|---|---|
| 1,503,390 | Tenney | July 29, 1924 |
| 1,949,641 | Awa et al. | Mar. 6, 1934 |
| 2,224,941 | Weimer | Dec. 17, 1940 |
| 2,676,631 | Wood | Apr. 27, 1954 |

FOREIGN PATENTS

| | | |
|---|---|---|
| 180,503 | Germany | Jan. 17, 1907 |